J. GRIBBEL & C. ATHERTON.
METER.
APPLICATION FILED JAN. 22, 1916.
1,232,027.
Patented July 3, 1917.
FIG. I.
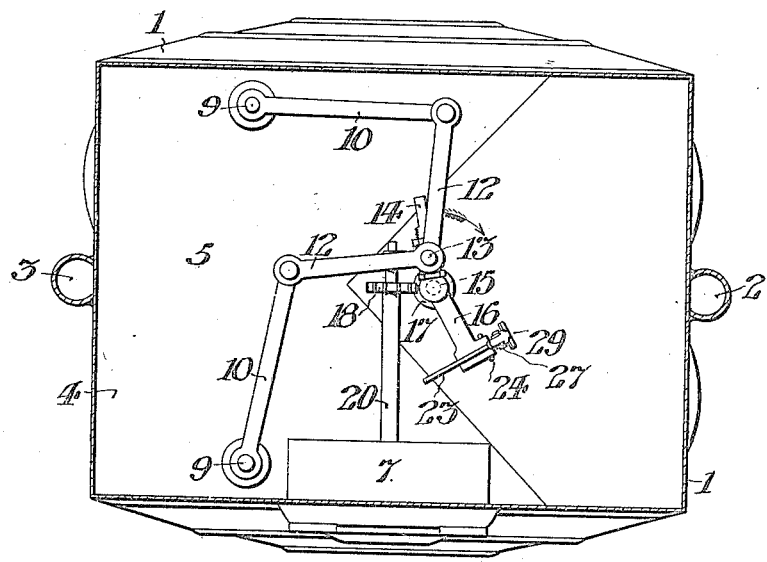
FIG. II.
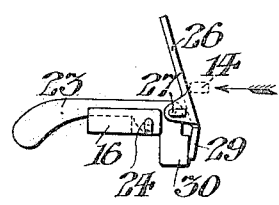
FIG. III.
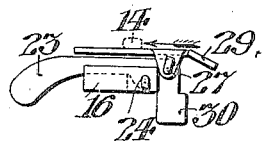
FIG. IV.
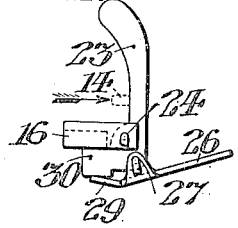
WITNESSES:
John Gribbel and
Charles Atherton,
INVENTORS:

UNITED STATES PATENT OFFICE.

JOHN GRIBBEL, OF WYNCOTE, AND CHARLES ATHERTON, OF PHILADELPHIA, PENN-
SYLVANIA; SAID ATHERTON ASSIGNOR TO SAID GRIBBEL.

METER.

1,232,027.  Specification of Letters Patent.  Patented July 3, 1917.

Application filed January 22, 1916. Serial No. 73,560.

*To all whom it may concern:*

Be it known that we, JOHN GRIBBEL and CHARLES ATHERTON, citizens of the United States, respectively residing at Wyncote, in the county of Montgomery, and at Philadelphia, in the county of Philadelphia, in the State of Pennsylvania, have invented a certain new and useful Improvement in Meters, whereof the following is a specification, reference being had to the accompanying drawing.

Our invention is particularly applicable to meters of the double bellows type, wherein reciprocatory movement of the bellows effects continuous rotary movement of a crank shaft and crank which is operatively connected with the registering mechanism. In order to prevent the consumer from reversing the normal position of such a meter, with reference to the inlet and outlet pipes, to fraudulently run the registering mechanism backward after consumption of gas has been registered, it is usual to provide such meters with a pivoted detent which is encountered and displaced by the crank during its rotation in the normal direction but encounters said crank and stops it when any attempt is made to turn it in the reverse direction. However, if gas is permitted to pass through such a meter to charge the piping system of a building, at the usual pressure, while the building is at low temperature, and the building is subsequently heated, without release of the gas thus trapped between the meter and the burners, a back pressure is exerted upon the meter, so far in excess of the normal supply pressure that when the registering mechanism is stopped by the detent aforesaid with the bellows in collapsed position, such back pressure upon the bellows breaks some portion of the mechanism by which the bellows are connected with the registering mechanism. Therefore, it is the object of our invention to provide a detent or stop mechanism for such a meter, so constructed and arranged as to prevent breakage under the abnormal conditions aforesaid. As less than one reverse revolution of the crank suffices to permit the bellows to distend under the abnormal pressure, into positions where they can withstand the same without strain upon the connection with the registering mechanism, we provide a stop mechanism adapted to permit reverse movement of the crank to a sufficient extent to prevent breaking strain upon the meter mechanism, but capable of preventing continued reverse movement of the registering mechanism.

As hereinafter described, our invention includes a stop lever mounted to reciprocate in a plane parallel with the axis of said crank and to form an abutment which is encountered by the crank, so as to stop the latter, when said lever is upturned; but said lever is normally turned down, out of the path of said crank, and carries, pivotally connected therewith, a tappet lever which is counter balanced at its lower end so as to be normally upturned in the path of said crank; and the construction and arrangement are such that said tappet lever is idly turned down and released by said crank at each revolution of the latter in the normal direction, and without movement of the stop lever; but, upon movement of said crank in the opposite direction it encounters said tappet lever and turns it down in the opposite direction, so as to upturn the stop lever into position to encounter and stop the crank the next time it comes around, the entire tappet lever serving as a counter balance to maintain the stop lever in upturned position after it has been upturned.

Our invention includes the various novel features of construction and arrangement hereinafter more definitely specified.

In the drawings; Figure I is a plan view of an ordinary gas meter, with the top wall removed, showing a convenient embodiment of our invention in coöperative relation with the meter mechanism.

Fig. II is a fragmentary elevation of the stop mechanism in its normal position.

Fig. III is a fragmentary elevation, similar to Fig. II, but showing the tappet lever turned down by the traverse of said crank in the normal direction.

Fig. IV is a fragmentary elevation, similar to Fig. II but showing the stop mechanism upturned to encounter and stop said crank.

Referring to Fig. I; the meter 1 has the gas inlet 2 and gas outlet 3 leading to and from the bellows chamber which is beneath the floor 4 of the chamber 5 from which the gas is excluded and in which the dial box 7 is mounted between said floor 4 and the top wall of the meter casing which is removed in Fig. I.

The meter mechanism beneath said floor 4 of said chamber 5 is of ordinary construction, including bellows diaphragms operatively connected with the rock shafts 9 respectively carrying the lever arms 10, in rigid relation therewith said arms being pivotally connected by the links 12 with the adjustable wrist pin 13 on the crank 14. Said crank 14 is carried on the rotary shaft 15, which has a bearing in the stationary bracket 16, and is provided with the worm 17 engaging the worm gear 18 on the dial arbor 20, and the latter is operatively connected with suitable registering mechanism in said dial box 7 to indicate upon the exterior of the meter the quantity of gas which has passed therethrough.

Said stationary bracket 16 is slotted to receive the stop lever 23 which is fulcrumed therein upon the pin 24 and normally lies in the position shown in Figs. I, II and III. Said stop lever 23 carries the tappet lever 26 which is fulcrumed upon the pin 27, extending through said lever 23, and has at the lower end thereof the counter balance 29 which causes said tappet lever 26 to gravitate to the position shown in Figs. I and II, wherein said counter balance bears upon the arm 30 of said lever 23. Said crank 14 is normally continuously turned in the direction of the arrows in Figs. I, II and III, by the rocking movement of the shafts 9 and arms 10, under pressure of the gas passing through the meter and causing the bellows to alternately expand and collapse. During such normal rotation of said crank 14, said tappet lever 26 is normally upturned in the path thereof, as shown in Fig. II, but is turned down to the position shown in Fig. III by the traverse of said crank. However, each time said tappet lever 26 is released by the continued turning movement of said crank, in the direction indicated by the arrow in Fig. III, said lever 26 instantly gravitates to its normal position shown in Fig. II so that when, under the abnormal conditions above contemplated, in which back pressure is exerted upon the meter mechanism, tending to turn said crank 14 in the direction opposite to that indicated by the arrows in Figs. I, II and III; said crank encounters the upturned tappet lever 26, upon the opposite side thereof to that upon which it is indicated in Fig. II, and by its continued turning movement in the reverse direction, opposite to the arrow shown in Fig. II, turns down said tappet lever 26, in the opposite direction to that indicated in Fig. III, so as to overbalance the stop lever 23 and upturn it to the position shown in Fig. IV. Thereupon, the next time said crank 14 comes around, in the reverse direction indicated by the arrow in Fig. IV, it is stopped by said lever 23, which remains in the position shown in Fig. IV while overbalanced by the tappet lever 26. However, the freedom thus afforded to said crank 14 to turn a complete revolution in the reverse direction, indicated by the arrow in Fig. IV, before its final encounter with the stop lever 23, as indicated in that figure, suffices to permit the bellows mechanism to reach a position where it is capable of withstanding the back pressure without breaking strain upon the connecting mechanism including said arms 10, which are rigidly connected with the bellows rock shafts 9 as above described. It may be observed that in meters provided with ordinary stop mechanism, which do not permit such freedom of reverse movement, the back pressure suffices to break one or the other of said rigid lever arms 10.

It is to be particularly noted that, whereas the abnormal conditions above contemplated suffice to so damage an ordinary meter that it is necessary to disconnect and repair the same each time they occur, on the contrary, our improved stop mechanism is automatically restored, from its abnormal position shown in Fig. IV to the normal position shown in Fig. II, merely by the normal turning movement of said crank 14, in the direction indicated by the arrows in Figs. I, II and III; so that such abnormal conditions above contemplated are automatically met and compensated by our invention, not only without requiring any repairs of the meter mechanism but without requiring any attention whatever.

Although we have found it convenient to illustrate and describe our improved stop mechanism with reference to an ordinary type of gas meter, it is to be understood that our invention may be utilized in connection with mechanism of any kind requiring such limited escapement as it affords.

Therefore, we do not desire to limit ourselves to the precise details of construction and arrangement herein set forth, as it is obvious that various modifications may be made therein without departing from the essential features of our invention as defined in the appended claims.

We claim:—

1. In a meter including a crank which is turned by pressure of gas in the meter; means adapted to limit the freedom of reverse turning movement of said crank, including a stop lever mounted to reciprocate in a plane parallel with the axis of said crank and to form an abutment which is encountered by the crank, so as to stop the latter, when said lever is upturned; said lever being normally turned down, out of the path of said crank, and carrying, pivotally connected therewith, a tappet lever with a counter balance at its lower end; whereby said tappet lever is normally upturned in the path of said crank and is idly turned down and released by said crank at each revolution of the latter, in the normal direction, without movement of the stop lever; but, upon movement of said crank in the opposite direction, it encounters said tappet lever and turns it down in the opposite direction, so as to upturn said stop lever into position to encounter and stop the crank the next time it comes around; said tappet lever serving as a counter balance tending to maintain the stop lever in upturned position after it has been upturned.

2. In a meter including a crank which is turned by pressure of gas in the meter; means adapted to limit the freedom of reverse turning movement of said crank, including a stop lever forming an abutment which is encountered by the crank, so as to stop the latter, when said lever is upturned; said lever being normally turned down, out of the path of said crank; a tappet lever, carried by said stop lever, with a counter balance at its lower end; whereby said tappet lever is normally upturned in the path of said crank and is idly turned down and released by said crank at each revolution of the latter, in the normal direction, without movement of the stop lever; but, upon movement of said crank in the opposite direction, it encounters said tappet lever and turns it down in the opposite direction, so as to upturn said stop lever into position to encounter and stop the crank the next time it comes around, in said reverse direction; said tappet lever serving as a counter balance tending to maintain the stop lever in upturned position after it has been upturned.

3. In a meter including a crank which is normally turned by pressure of fluid on it; means adapted to limit the freedom of reverse movement of said crank, including a stop lever which is encountered by the crank, so as to stop the latter, when said lever is shifted to abnormal position; a tappet lever operatively connected with said stop lever, constructed and arranged to be moved by said crank, at each revolution of the latter, in the normal direction, without movement of the stop lever; movement of said crank in the reverse direction causing it to encounter said tappet lever, turn it in the reverse direction, and present said stop lever in position to encounter and stop said crank from repeated reverse revolution: said tappet lever tending to hold said stop lever in operative position after it has been thus presented.

4. In a meter including a crank which is normally turned by pressure of fluid on it; means adapted to limit the freedom of reverse movement of said crank, including a stop lever which is encountered by the crank, so as to stop the latter, when said lever is shifted to abnormal position; a tappet lever operatively connected with said stop lever, constructed and arranged to be moved by said crank, at each revolution of the latter, in the normal direction, without movement of the stop lever; movement of said crank in the reverse direction, causing it to encounter said tappet lever, and turn it in the reverse direction, and present said stop lever in position to encounter and stop said crank from repeated reverse revolution.

5. The combination with a crank; of means adapted to limit the freedom of movement of said crank, in one direction, including a stop lever, which is normally maintained out of the path of said crank; a tappet lever carried by said stop lever, and pivotally connected therewith, having a counter balance at its lower end; whereby said tappet lever is normally upturned in the path of said crank and is idly turned down and released by said crank at each revolution of the latter, in the normal direction, without movement of said stop lever; movement of said crank in the reverse direction causing it to encounter said tappet lever, turn it in the reverse direction, and present said stop lever in position to encounter and stop said crank from repeated reverse revolution; said tappet lever tending to hold said stop lever in operative position after it has been thus presented.

6. The combination with a crank; of means adapted to limit the freedom of movement of said crank, in one direction, including a stop lever, which is normally maintained out of the path of said crank; a tappet lever carried by said stop lever, normally upturned in the path of said crank, adapted to be idly turned down and released by said crank at each revolution of the latter, in the normal direction, without movement of said stop lever; movement of said crank in the reverse direction causing it to encounter said tappet lever, turn it in the reverse direction, and present said stop lever in position to encounter and stop said crank from repeated reverse revolution.

In testimony whereof, we have hereunto signed our names at Philadelphia, Pennsylvania, this eighteenth day of January, 1916.

JNO. GRIBBEL.
CHARLES ATHERTON.

Witnesses:
FERDINAND A. NORDEMAN,
JOHN J. HAGERTY.